US012762115B1

(12) United States Patent
Kulas

(10) Patent No.: US 12,762,115 B1
(45) Date of Patent: Oct. 13, 2026

(54) BUILDING QUERY CONTEXT USING INTERMEDIATE QUERIES

(71) Applicant: Amazon Technologies, Inc., Seattle, WA (US)

(72) Inventor: Joshua Kulas, Washington, DC (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 19/091,479

(22) Filed: Mar. 26, 2025

(51) Int. Cl.

| | |
|---|---|
| ***G06F 16/00*** | (2019.01) |
| ***G06F 16/242*** | (2019.01) |
| ***G06F 16/2455*** | (2019.01) |
| ***G06F 16/2457*** | (2019.01) |

(52) U.S. Cl.
CPC .... *G06F 16/2425* (2019.01); *G06F 16/24561* (2019.01); *G06F 16/24575* (2019.01)

(58) Field of Classification Search
CPC ........... G06F 16/2425; G06F 16/24561; G06F 16/24575
USPC .................................................. 707/600–899
See application file for complete search history.

(56) References Cited

U.S. PATENT DOCUMENTS

| | | | |
|---|---|---|---|
| 10,409,898 | B2 | 9/2019 | Sharma et al. |
| 10,474,709 | B2 | 11/2019 | Paulus |
| 10,614,106 | B2 | 4/2020 | Kelsey et al. |
| 10,685,050 | B2 | 6/2020 | Krishna et al. |
| 10,909,157 | B2 | 2/2021 | Paulus et al. |
| 10,929,392 | B1 | 2/2021 | Cheng |
| 11,017,156 | B2 | 5/2021 | Hwang |
| 11,455,543 | B2 | 9/2022 | D'souza et al. |
| 11,501,202 | B1 | 11/2022 | Stefani |
| 11,557,276 | B2 | 1/2023 | Bender et al. |
| 12,001,462 | B1 | 6/2024 | Madisetti et al. |
| 12,511,282 | B1 * | 12/2025 | Ojha ................. G06F 16/24522 |
| 2021/0134173 | A1 | 5/2021 | Yuan et al. |
| 2024/0095077 | A1 | 3/2024 | Singh et al. |
| 2024/0111498 | A1 | 4/2024 | Vaughn |
| 2025/0005298 | A1 | 1/2025 | Saket et al. |
| 2025/0293998 | A1 * | 9/2025 | Courcelle ............ G06N 3/0895 |
| 2025/0321967 | A1 * | 10/2025 | Strader ............. G06F 16/24553 |
| 2025/0328525 | A1 * | 10/2025 | Mishra .............. G06F 16/24522 |
| 2025/0335717 | A1 * | 10/2025 | Zhang ...................... G06F 40/40 |

(Continued)

OTHER PUBLICATIONS

Google DeepMind, "Teaching language models to support answers with verifiedquotes", Mar. 16, 2022, pp. 1-40.

(Continued)

*Primary Examiner* — Michelle N Owyang
(74) *Attorney, Agent, or Firm* — Alexander A. Knapp; Kowert, Hood, Munyon, Rankin & Goetzel, P.C.

(57) ABSTRACT

A data analytics service receives a question prompt, wherein the prompt requires one or more database format queries to be executed to determine an answer. The data analytics service uses a generative machine learning model to generate an initial database query, which is then executed on data sources associated with the service to retrieve initial results. The data analytics service stores the results of this query in an intermediate storage location, and subsequently, the data analytics service executes intermediate queries to refine and filter the initial retrieved data. The data analytics service generates an updated database query using context derived from results of the intermediate queries, which is used to determine an updated database format query.

20 Claims, 9 Drawing Sheets

(56) References Cited

U.S. PATENT DOCUMENTS

| | | | | |
|---|---|---|---|---|
| 2025/0337701 | A1* | 10/2025 | Du | H04L 51/02 |
| 2025/0378106 | A1* | 12/2025 | Manivannan | G06F 16/358 |
| 2026/0134232 | A1* | 5/2026 | Ahrens | G06F 40/58 |

OTHER PUBLICATIONS

Pei Zhouo, et al., "Think Before You Speak: Explicitly Generating Implicit Commonsense Knowledge for ResponseGeneration," https://arxiv.org/abs/2110.08501, Jun. 7, 2022, pp. 1-17.

"Yi Tay, et al.., ""Transformer Memory as a Differentiable Search Index,"" https://arxiv.org/abs/2202.06991, Oct. 21, 2022, pp. 1-14."

Yujing Wang, et al., "A Neural Corpus Indexer for Document Retrieval," https://arxiv.org/abs/2206.02743, Feb. 12, 2023, pp. 1-19.

"Bernd Bohnet, et al., ""Attributed Question Answering: Evaluation and Modeling for Attributed Large Language Models"" https://arxiv.org/abs/2212.08037, Feb. 10, 2023, pp. 1-15."

Aleksandra Piktus, et al., "Retrieval-Augmented Generation for Knowledge-Intensive NLP Tasks," https://arxiv.org/abs/2005.11401, Apr. 12, 2021, pp. 1-19.

U.S. Appl. No. 18/961,278, filed Nov. 26, 2024, Leonid Razoumov, et al.

U.S. Appl. No. 18/759,561, filed Jun. 28, 2024, Suhas Benkatesh Murthy, et al.

U.S. Appl. No. 18/743,004, filed Jun. 13, 2024, Punit Ghodasara, et al.

U.S. Appl. No. 18/901,847, filed Sep. 30, 2024, Brandon Tyler Diamond, et al.

U.S. Appl. No. 18/757,247, filed Jun. 27, 2024, Roland Mesde, et al.

U.S. Appl. No. 18/432,837, filed Feb. 5, 2024, Rohit Malshe et al.

U.S. Appl. No. 19/094,516, filed Mar. 28, 2025, David Kernert, et al.

* cited by examiner

BUILDING QUERY CONTEXT USING INTERMEDIATE QUERIES

BACKGROUND

Large language models (LLMs) are advanced machine learning models designed to understand and generate human language. LLMs may be employed across various scenarios requiring language comprehension. For instance, LLMs may be utilized in natural language processing (NLP) applications such as chatbots, content generation, and language translation, wherein LLMs may be required to interpret and produce text responses across diverse contexts. Given the broad spectrum of subject matters, LLMs are trained on large datasets encompassing different domains in order to ensure that the LLMs may be able to handle a wide variety of linguistic tasks, such as generating coherent and contextually appropriate answers to queries provided by a user.

Figure 1A:
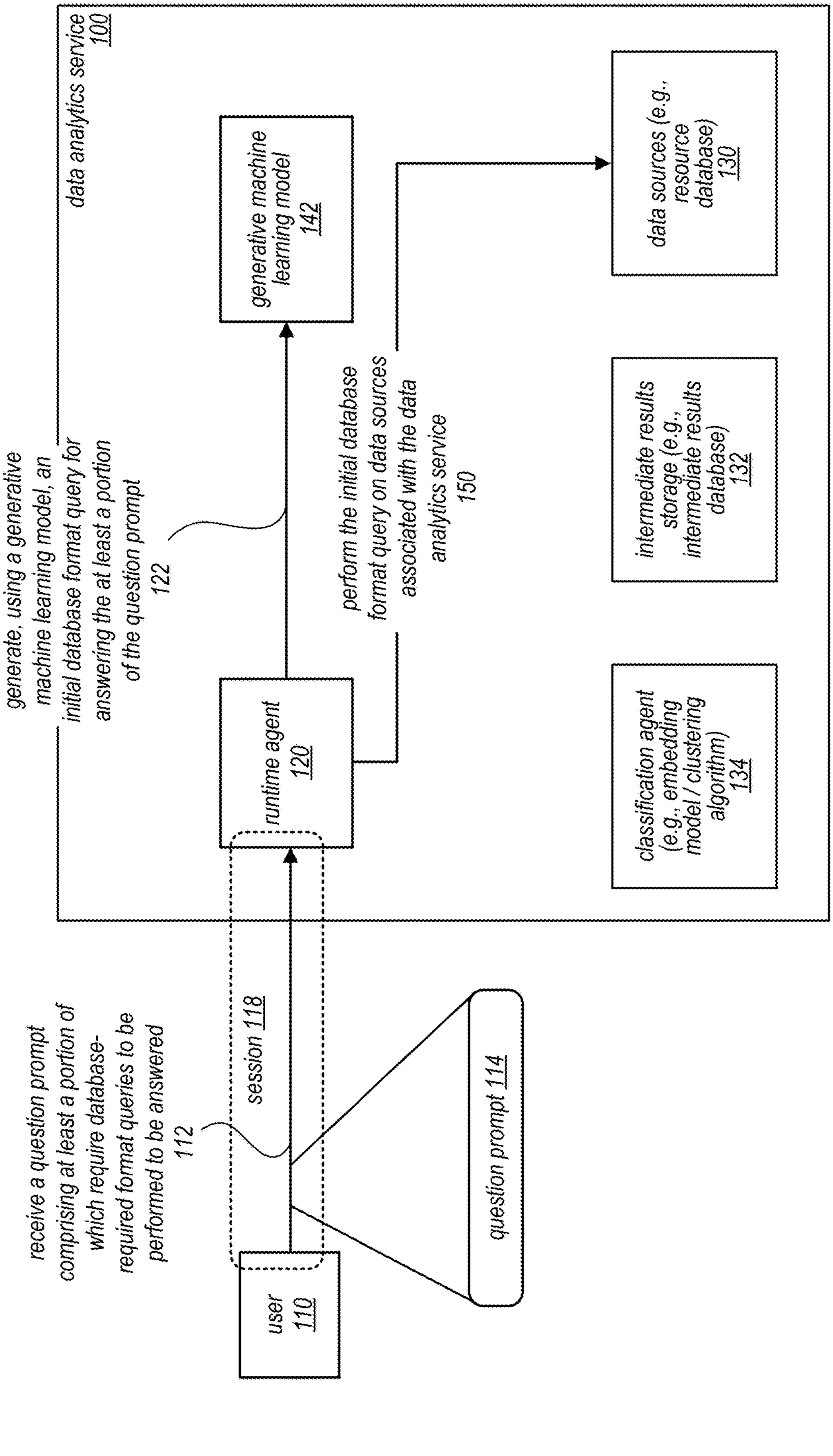
FIG. 1A is a block diagram illustrating a data analytics service that generates, using a generative machine learning model, an initial database format query for answering a question prompt comprising at least a portion of which require database format queries to be performed to be answered, according to some embodiments.

While embodiments are described herein by way of example for several embodiments and illustrative drawings, those skilled in the art will recognize that embodiments are not limited to the embodiments or drawings described. It should be understood that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (e.g., meaning having the potential to), rather than the mandatory sense (e.g., meaning must). Similarly, the words "include," "including," and "includes" mean including, but not limited to.

DETAILED DESCRIPTION OF EMBODIMENTS

The systems and methods described herein include techniques for implementing a data analytics service that receives a question prompt from a user, wherein at least a portion of the question prompt requires database format queries (e.g., SQL queries) to be performed to generate an answer. For example, a database formatted query is a query that conforms to a query format required by a database in order to execute the query. The data analytics service may utilize a generative machine learning model to generate an initial database format query for answering at least a portion of the question prompt. The initial database format query may be executed on one or more data sources associated with the data analytics service, and the resulting data may be stored in another storage location of the data analytics service. The data analytics service may then perform one or more intermediate database format queries on the stored results to refine the retrieved data. Using at least a portion of the results of the one or more intermediate database format queries, the data analytics service may modify the question prompt to incorporate additional context derived from the intermediate query results. The data analytics service may generate an updated database format query using the generative machine learning model, wherein the updated query is used to retrieve an updated result for answering the question prompt. The updated result may be processed to generate an answer, which is provided back to the user. The systems and methods described herein may allow iterative refinement of database format queries and dynamic question prompt augmentation to improve responses generated by the data analytics service.

At least one difficulty in the use of data analytics services may be a that a user is required to understand database format queries such as SQL queries. For example, a typical data analytics service may require users to write queries in a structured language such as SQL, which may impose a steep learning curve and exclude non-technical users from effectively interacting with the data analytics service. Even when query-building tools are available in the data analytics service, users may still struggle with understanding database schema, table relationships, and appropriate syntax to derive meaningful insights from the data. Furthermore, analytics services may not handle ambiguous or incomplete user inputs effectively. Another difficulty in the use of data analytics services may be when applying generative machine learning models to data analytics services. For example, a data analytics service may use generative machine learning model (e.g., large language model (LLM)) to generate database format queries (e.g., SQL queries) and may naively run the queries, but in such cases, the data analytics service may become overwhelmed with too large of a data set, leading to poorer-quality answers as LLMs may struggle with digesting large amounts of raw information. For example, a user may ask, "How many customers experienced multiple outages in the past 24 hours?" The system may generate an SQL query and pull thousands of rows from a database. If the data analytics service simply hands all of this data back to the LLM without any intermediate processing, the LLM may not be able to handle the large volume of data. Such large volume may lead to an incomplete, misleading, or incorrect answer. Moreover, generative models, may struggle to fully grasp the semantics of the underlying data in a data source (e.g., SQL database), especially when schema descriptions are incorrect, primary keys do not contain the expected information, or the presence of duplicate records affects query outcomes. Additionally, data analytics services may lack the ability to dynamically adapt "context" to supplement the question prompt, wherein "context" may be relevant background information, prior knowledge, or situational details that help guide the generative machine learning model in generating a response.

In some embodiments, a data analytics service may be configured to receive a question prompt from a user, wherein at least a portion of the question prompt may require database format queries to be performed to generate an answer. For example, a user may submit a query such as, "How many customers experienced multiple outages in the past 24 hours?" wherein the query is directed towards a database such as a SQL database. In some embodiments, instead of requiring the user to manually construct a database format query (e.g., a SQL query), the data analytics service may use a generative machine learning model to generate an initial database format query to retrieve relevant records. The data analytics service may execute this query on one or more data sources, such as a SQL database of customer event logs, and may store the results in an intermediate storage location within the data analytics service. In some embodiments, the data analytics service may perform one or more intermediate database format queries on the stored results to extract useful metadata before presenting data to the generative model. For example, if the initial query returns a subset of rows event data from the database, the data analytics service may run additional queries to determine summary statistics, such as the total number of affected customers, the most common duration of outages, or anomaly detection results only from the subset indicating whether certain customers have an unusually high number of incidents. Additionally, the data analytics service may compute summary statistics for certain columns, including minimum, maximum, mode, and other distribution-based insights, to better characterize the dataset before refining the query or presenting the final response. This intermediate processing may prevent the generative model from being overwhelmed by excessive raw data, reducing the likelihood of erroneous responses. In some embodiments, the data analytics service may use the results of the intermediate queries to modify the original question prompt, adding relevant context to improve the accuracy of the final query. For example, if the intermediate analysis determines that the mode of outage durations is 31, the system may recognize that this value corresponds to the number of days in a month, potentially indicating a data entry issue. In response, the refined prompt may include metadata such as the total count of records, the largest five outage durations, and sample outlier records. The generative model may then generate an updated database format query that specifically filters for anomalies, such as selecting customer records where the outage length is exactly 31 days. By including this additional contextual information, the data analytics service ensures that the refined query specifically investigates potential data inconsistencies. The data analytics service may then execute the updated query against the original data sources and generate a final answer for the user.

In some embodiments, a data analytics service may determine additional context for a question prompt based on the results of one or more intermediate database format queries. Context may include specific instructions, historical data, user preferences, constraints, or reference materials that provide clarity and scope for interpreting the prompt effectively. This context may be dynamically generated or retrieved from stored metadata related to the data source, previous user queries, previous intermediate queries, or domain-specific knowledge. For structured data sources such as SQL databases, context may include schema information, including relationships between tables, column data types, or indexing structures that may impact query generation. Additionally, intermediate query results may incorporate statistical summaries such as mean, median, mode, standard deviation, and distribution patterns of key numerical columns, which may help identify expected data ranges and potential anomalies. For example, in a prompt asking a generative machine learning model to generate SQL queries, the context may include details about the database schema, relevant table names, expected query format, and any filtering criteria. The determined context may include column statistics for the result of the database format query, such as counts, averages, or distributions of key fields. The context may also include business insights heuristically derived from query results, allowing the data analytics service. For example, business insights may include the results of analysis which are inferred from observing data patterns, outliers, or statistical trends associated with the database. These insights may be generated through heuristic methods applied to query outputs, such as rule-based logic, statistical thresholds, or anomaly detection models. For example, given the user question prompt "How many customers experienced multiple outages in the past 24 hours?", the data analytics service may first generate and execute a database format query to retrieve relevant customer event logs. Based on the intermediate results that shows a skewed distribution that while 10% of customers have experienced multiple outages, 80% of those affected were from a single geographic region, the system may heuristically derive a business insight suggesting that a localized infrastructure issue (e.g., a regional hub failure) may be impacting service in that region. As another example, the business insights may infer a business context from the question, such as inferring that the business context is that of a service provider, such as internet, power, or other type of service provider.

In some embodiments, the data analytics service may store the results of a database format query in an internal table at another storage location, wherein the stored result is not directly accessible to the user submitting the question prompt. By keeping the raw query results in an internal repository, the service may prevent users from handling excessive or unstructured data while still allowing the data analytics service to process the stored results for further query refinement. The data analytics service may reduce unnecessary data transfers and ensure that only structured and relevant insights are surfaced to the user.

In some embodiments, one or more computing devices implementing the data analytics service may be configured to store the context derived from a question prompt within a session. If the data analytics service receives another question prompt within the same session that requires database format queries, the data analytics service may determine whether the stored context remains relevant. If so, the data analytics service may modify the subsequent question prompt using at least a portion of the results from the intermediate database format queries performed earlier and allow iterative data exploration without redundantly reprocessing previously analyzed data.

In some embodiments, the data analytics service may classify a given job type associated with a received question prompt and may determine whether previously stored query context is relevant based on the job classification. For example, if a user submits a question related to customer outage incidents and later submits another question regarding service disruptions, the data analytics service may classify both queries under a related operational analysis category. Based on this classification, the data analytics service may retrieve prior query context and use it to refine the subsequent question. In some embodiments, the data analytics service may store manage previously obtained context from a question prompt for future retrieval. If a user submits another question prompt in a different session, the service may determine whether the previously stored context remains relevant. If so, the data analytics service may modify the new question prompt using at least a portion of the results from the earlier intermediate database format queries.

FIG. 1A is a block diagram illustrating a data analytics service that generates, using a generative machine learning model, an initial database format query for answering a question prompt comprising at least a portion of which require database format queries to be performed to be answered, according to some embodiments.

In some embodiments, a data analytics service 100 comprises a runtime agent 120, a data sources database 130, an intermediate results storage database 132, and a classification agent 134. The runtime agent 120 may serve as the central orchestrator, receiving user queries in natural language, converting them into structured queries, and managing iterative refinement processes (e.g., dynamically determining intermediate database format queries). The data sources 130 may include structured databases, such as SQL-based systems, where raw data is maintained. The intermediate results storage 132 may act as a caching layer, storing intermediate query results that may be used for further refinement, summarization, or validation before final response. The classification agent 134 may be implemented using an embedding model and/or clustering algorithm and may analyze query patterns, classify user intents, and suggest exploratory metadata queries or relevant summarization techniques based on one or more of a job type of a question prompt, historical intermediate exploratory questions associated with the a question prompt, or domain-specific knowledge useful for the question prompt.

In some embodiments, a user 110 may generate a question prompt 114 for the data analytics service 100 to generate an answer to. In some embodiments, the user 110 may be an operator (e.g., an electrical grid operator), or any non-technical professional needing data-driven insights without database format language (e.g., SQL) proficiency. The runtime agent 120 may receive a question prompt 112 from the user in natural language, where at least a portion of the request requires database-formatted queries to retrieve an answer. For example, a user may input, "How many customers experienced multiple outages in the last 24 hours?" The runtime agent 120 may parse the prompt, infer the necessary database format query (e.g., SQL query), execute it against the data sources 130, and retrieve results. The data analytics service 100 may store the result in the intermediate results storage 132 and generate additional intermediate database format queries (e.g., metadata queries) to determine insights such as counts, means, or anomaly determination or analysis. In some embodiments, the question prompt 114 may be provided in various formats and/or modes. For example, the question prompt 114 may be presented as a text-based query in various file formats. In some embodiments, the question prompt 114 may take other modes such as an audio recording where the user 110 verbally asks a question and wherein a speech-to-text module of the data analytics service 100 processes the spoken input to convert it into a textual form. Furthermore, the question prompt 114 may be presented in a single-mode form, such as text-only, or in a multi-modal form that combines different input types. For example, the user 110 may submit a question with an accompanying image or chart that visually represents a dataset the user 110 is inquiring about. In another example, a question prompt 114 may include both text and audio, wherein the user 110 verbally describes the analytical need while providing supporting textual keywords or metadata.

In some embodiments, the runtime agent 120 may provide the received question prompt 114 to a generative machine learning model 142 to generate 122 an initial database format query. In some embodiments, the runtime agent 120 may preprocess the question prompt 114 by tokenizing the input, extracting relevant entities, and classifying the intent using a language model or intent recognition module. The preprocessed input may then be passed to a generative machine learning model, such as a large language model (LLM) fine-tuned for SQL generation. The model may use learned patterns from historical queries, database schema knowledge, and contextual information from the session 118 to construct an initial structured query in a format suitable for execution against target data sources (e.g., data sources 130). The generated database format query may undergo validation, where the runtime agent 120 may check for syntax errors, logical consistency, and constraints that align with the data schema to ensure execution feasibility.

In some embodiments, the runtime agent 120 may perform 150 the initial database format query on the data sources 130 associated with the data analytics service 150. Upon successful validation, the runtime agent 120 may route the generated query to the appropriate data source 130, which may include SQL-based databases or other structured databases. The runtime agent 120 may leverage an execution layer that connects to these data sources (e.g., data sources 130) using standard query protocols such as SQL for structured databases. Once the query is executed, the runtime agent 120 may receive the results and assess their completeness and usability.

In some embodiments, a question prompt 114 may be a structured or unstructured natural language request that the runtime agent 120 processes to extract actionable information. A question prompt 114 may be associated with a session 118, which tracks ongoing interactions between the user 110 and the data analytics service 100. Sessions 118 may allow for multi-step query refinement, enabling the user to iterate on previous questions. For example, after asking for the number of outages, the user may follow up with, "Show me locations with the highest recurrence," and the session 118 may maintain context from the prior query and allow reuse of at least a portion of the previous context, as further discussed in FIG. 3.

In at least one embodiment, a session may be ended automatically or otherwise complete when an explicit session termination protocol is followed (e.g., as a result of the user 110 initiating the session termination protocol) and/or in the event of a network failure, application failure, orchestration failure, application timeout or other period of time where no communications are received.

Figure 1B:
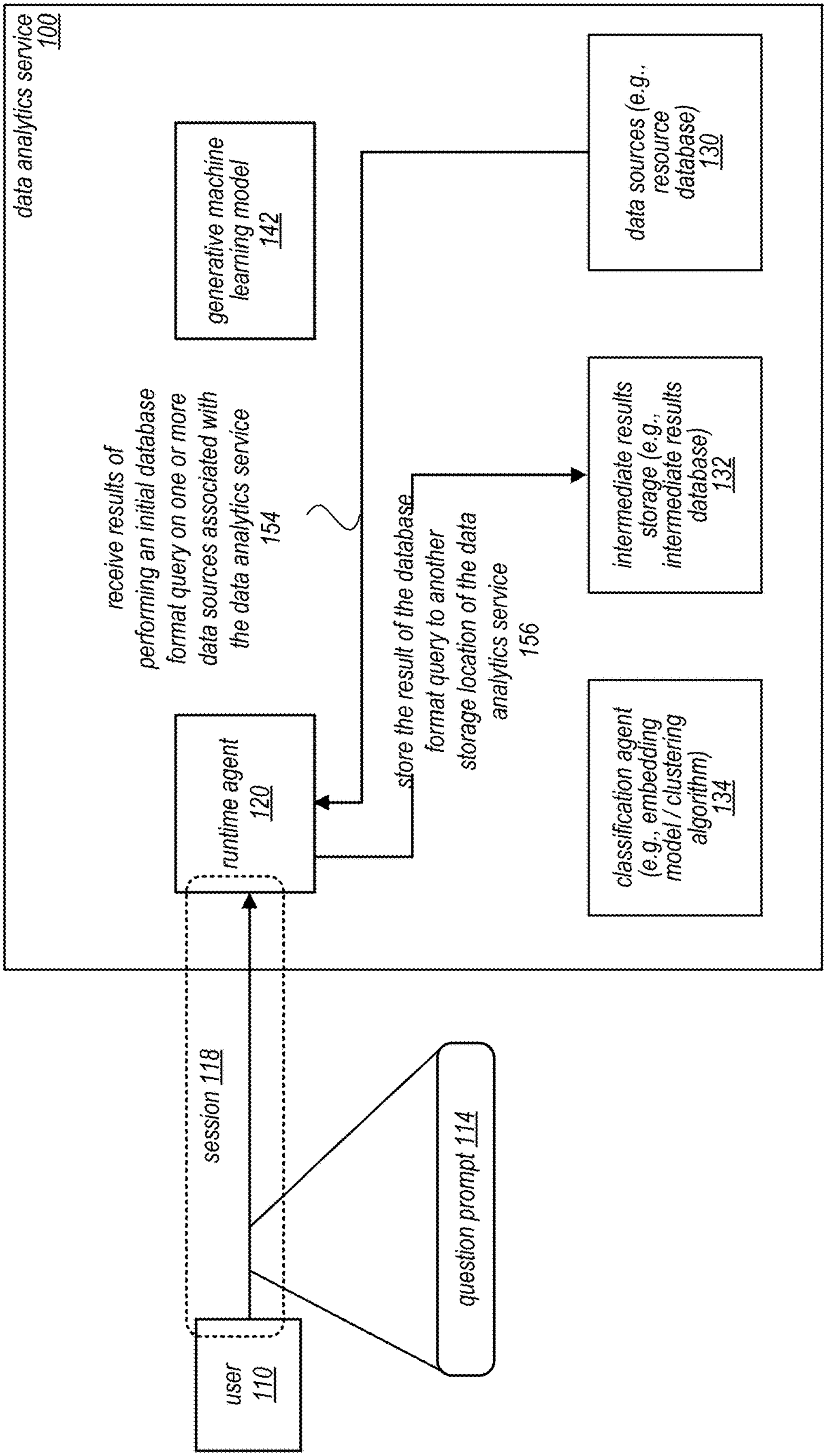
FIG. 1B is a block diagram illustrating a data analytics service that stores a result of an initial database format query to another storage location of the data analytics service, according to some embodiments.

FIG. 1B is a block diagram illustrating a data analytics service that stores a result of an initial database format query to another storage location of the data analytics service, according to some embodiments.

In some embodiments, a runtime agent 120 may receive 154 a results of performing an initial database format query on one or more data sources 130 associated with a data analytics service 100. Once the initial database-required query is executed against the relevant data sources 130, the underlying database management system or API may return the query results to the runtime agent 120. These results may be structured, such as tabular data from a relational database. The runtime agent 120 may inspect the retrieved data, assess its completeness, and determine whether further refinement is necessary. The runtime agent 120 may decide to store them for further processing rather than immediately returning them to the user.

In some embodiments, the runtime agent 120 may store the result of the database format query to another storage location of the data analytics service, such as the intermediate results storage 132, to enable further analysis. The intermediate results storage 132 may function as a caching layer where query outputs from the data sources 130 are stored to facilitate iterative processing, metadata extraction, and summarization. For example, the runtime agent 120 may generate additional exploratory queries on the stored results to derive statistical insights, detect anomalies, or refine filtering criteria before constructing a final response. For example, if the initial query returns a subset of columns or rows from the data sources 130, the runtime agent 120 may execute metadata queries on the subset, such as computing counts, averages, or cluster distributions and use these insights to refine subsequent queries. Such staged processing approach may reduce resource costs (e.g., processing cost or time) associated with directly performing the intermediate queries on an entire data set of the data sources 130.

In some embodiments, the results stored in the intermediate results storage 132 may not be directly visible to the user submitting the question prompt. Instead of exposing the initial query outputs or results of the intermediate queries, the runtime agent 120 may utilize these stored results for backend processing while selectively extracting and summarizing relevant insights for the user. The system may enforce access restrictions such that only processed, aggregated, or validated information is included in the final response. By keeping intermediate results hidden from direct access to a user 110, the data analytics service 100 may iteratively refine responses without overwhelming users with large data sets or incomplete data.

Figure 1C:
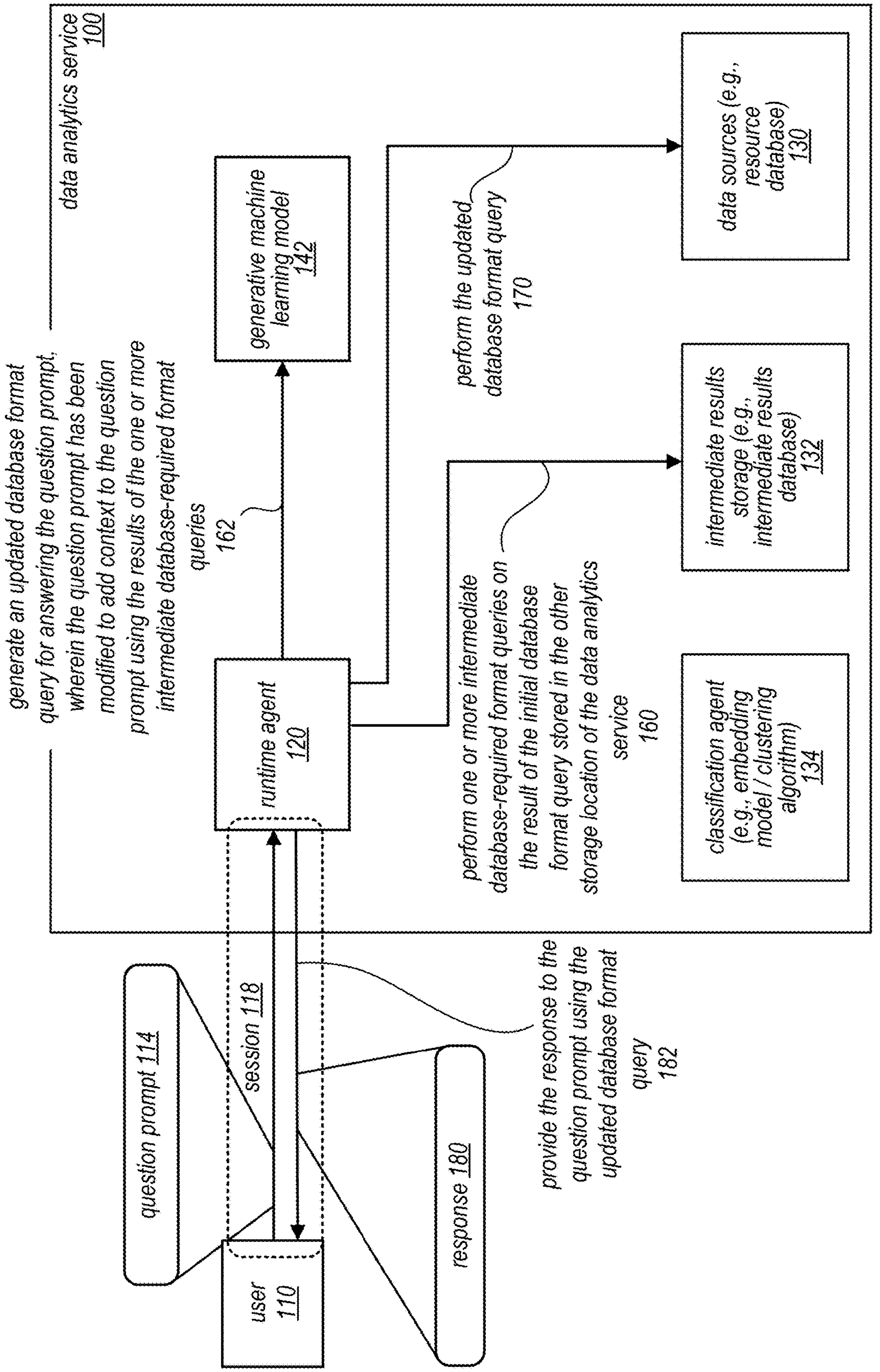
FIG. 1C is a block diagram illustrating a data analytics service that performs intermediate database format queries on a result of an initial database format query stored in another storage location of the data analytics service, wherein an updated database format query is generated using results of the intermediate database format queries, according to some embodiments.

FIG. 1C is a block diagram illustrating a data analytics service that performs intermediate database format queries on a result of an initial database format query stored in another storage location of the data analytics service, wherein an updated database format query is generated using results of the intermediate database format queries, according to some embodiments.

In some embodiments, a runtime agent 120 may perform 160 one or more intermediate database format queries on the result of the initial database format query stored in an intermediate results storage 132. After an initial query results are stored at the intermediate results storage 132, the runtime agent 120 may analyze the data stored therein and determine whether additional computations, aggregations, or refinements are required. These intermediate queries may include statistical analyses, such as calculating counts, averages, or detecting anomalies, or may involve clustering techniques to identify patterns in the dataset. The runtime agent 120 may use these insights to generate additional context prompts with which to improve upon the initial database format query (e.g., catching errors in the data set, filtering out inconsistencies or redundant data, etc.). These intermediate queries may be dynamically generated based on a question prompt 114 and various characteristics associated with the question prompt (e.g., job type), as further discussed in FIG. 2.

In some embodiments, the runtime agent 120 may use a generative machine learning model 142 to generate 162 an updated database format query for answering the question prompt, wherein the question prompt has been modified to add context using the results of the one or more intermediate database format queries. The generative model 142 may incorporate metadata from the stored results, such as summary statistics or detected anomalies, to refine the query logic. For example, if the initial query retrieved a large dataset with potential outliers, the updated query may exclude extreme values or focus on specific clusters of interest. The model may dynamically adjust filtering conditions, join conditions, or ordering criteria to improve accuracy. Additionally, by leveraging embeddings or similarity-based retrieval mechanisms, the model may reframe the question prompt to better align with the user's intent while maintaining contextual continuity.

In some embodiments, the runtime agent 120 may further refine the updated database format query by iteratively validating and adjusting query logic based on detected patterns or anomalies in the intermediate results. For example, after generating summary statistics from the initial query, the agent may identify an unexpectedly high mode value for the number of outages per customer, such as 31, suggesting a potential data quality issue or a recurring pattern aligned with a calendar month. In response, the generative model 142 may generate a follow-up query to investigate whether these outages are associated with specific billing cycles, maintenance windows, or data entry inconsistencies. The agent may then construct additional intermediate query results (e.g., metadata) queries, such as filtering for specific date ranges, detecting duplicate records, or clustering similar event patterns, before submitting an optimized query for final execution. For example, if the runtime agent determines that multiple outages longer than 24 hours are disproportionately affecting certain customer segments, the runtime agent 120 may generate a refined query to analyze outage distribution across different geographic regions or service plans.

In some embodiments, the runtime agent 120 may perform 170 the updated database format query by executing it on the data sources 130, taking into account the modifications introduced by the intermediate processing. This query execution may involve retrieving refined data subsets, applying advanced analytical functions, or aggregating results to provide more meaningful insights. If necessary, the runtime agent 120 may again store the updated results in the intermediate results storage 132, allowing for further iteration or validation before presenting a final response. This iterative querying process ensures that responses are both precise and tailored to the user's analytical needs while minimizing unnecessary data retrieval. In some embodiments, the runtime agent 120 may provide 182 a response 180 to the question prompt using the updated database format query. The response 180 may be generated based on the results of the updated database format query and may be in a structured format suitable for a user 110. In some embodiments, the results of intermediate database format queries performed on the intermediate results storage 132 may be a terminal result, wherein the response 180 is based on the results of the intermediate query itself without performing subsequent downstream queries. For example, in some embodiments, the response 180 may be generated without requiring an additional updated database format query being generated or performed on the data sources 130. For example, if the intermediate results indicate that a dataset contains no matching records (e.g., when an initial query for customer outages in a region returns that none has occurred) the runtime agent 120 may return a terminal response stating that no relevant data exists, rather than executing further database format queries. Similarly, if a user requests a summary statistic (e.g., average number outages for a specific time period) and the intermediate queries have already computed and/or stored this statistic, the runtime agent 120 may retrieve the precomputed value from the intermediate results storage 132 instead of re-executing the same query/calculations on the data sources 130.

Figure 2:
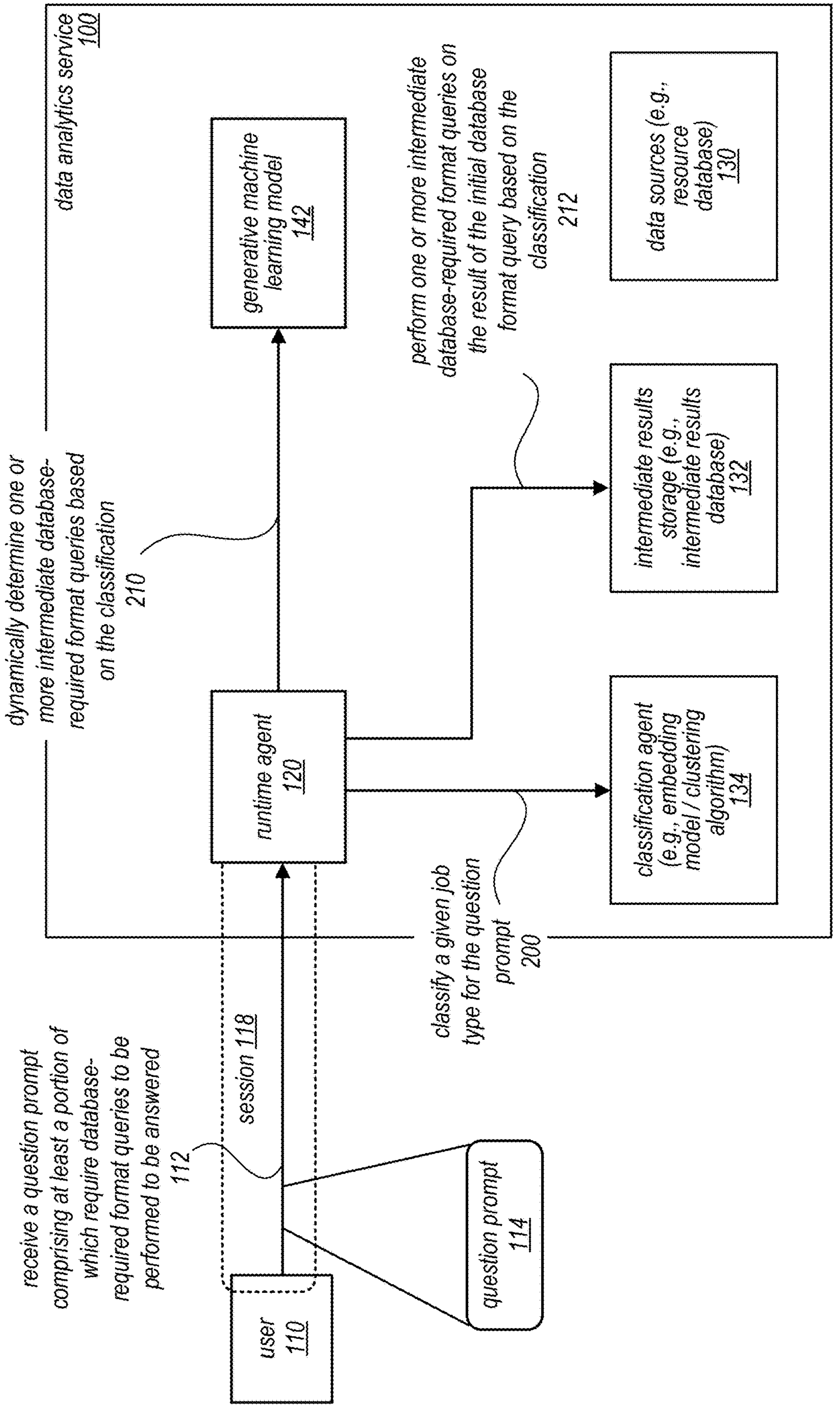
FIG. 2 illustrates a more detailed view of a data analytics service that dynamically determines one or more intermediate database format queries based on classification of a question prompt, according to some embodiments.

FIG. 2 illustrates a more detailed view of a data analytics service that dynamically determines one or more intermediate database format queries based on classification of a question prompt, according to some embodiments.

In some embodiments, the runtime agent 120 may perform 212 one or more intermediate database format queries on the result of the initial database format query stored in an intermediate results storage 132 based on a classification for a question prompt 112*t*. After the initial query results are stored, the runtime agent 120 may analyze the data and determine whether additional computations, aggregations, or refinements are required. These intermediate queries may include statistical analyses, such as calculating counts, averages, or detecting anomalies, or may involve clustering techniques to identify patterns in the dataset. The runtime agent 120 may use these insights to assess the quality and relevance of the initial results, filtering out inconsistencies or redundant data. These intermediate queries may be dynamically generated based on the data characteristics, ensuring that subsequent analyses remain contextually relevant to the original user request. For example, in some embodiments, the classification agent 134, using techniques such as embedding models and clustering algorithms, may analyze the semantic content of a question prompt alongside the characteristics of the initial query results stored in the intermediate results storage 132 to determine a job type associated with a question prompt 114. The classification agent 134 may first convert the question prompt 114 into a high-dimensional embedding using a pretrained model and may compare this representation with embeddings of previously labeled queries. Based on key phrases and syntactic patterns, the classification agent 134 may assign the prompt to categories such as aggregation, anomaly detection, trend analysis, or comparison analysis. For example, if the question prompt 114 contains words such as "total," "average," or "sum," the classification agent 134 may classify it as an aggregation task, prompting the runtime agent 120 to execute intermediate queries that calculate counts, averages, or sums-such as determining the average outage duration per customer. In some embodiments, if the prompt includes terms such as "spike" or "unusual," the classification agent 134 may classify it as an anomaly detection task, triggering queries that compute standard deviations, detect outliers, or filter out extreme values. Similarly, a prompt indicating a need for temporal or period-over-period comparison would lead to time-series queries, such as grouping data by month or calculating percentage changes between periods. Once the classification agent has determined the appropriate job type, the classification information (e.g., a job type) may be used to guide the runtime agent in dynamically selecting and executing the most contextually relevant intermediate database format queries (e.g., SQL queries) on the stored results.

In some embodiments, the runtime agent 120 may use a generative machine learning model 142 to dynamically determine 210 an updated database format query for answering the question prompt, wherein the question prompt has been modified to add context using the results of the one or more intermediate database format queries. The generative machine learning model 142 may incorporate metadata from the stored results, such as summary statistics or detected anomalies, to refine the query logic. For example, if the intermediate analysis determines that the mode of outage durations is 31, the system may recognize that this value corresponds to the number of days in a month, potentially indicating a data entry issue. In response, the updated prompt may include context comprising metadata such as the total count of records, the largest five outage durations, and sample outlier records. The generative machine learning model 142 may then generate an updated database format query (updated SQL query) that specifically filters for anomalies, such as selecting customer records where the outage length is exactly 31 days. By including this additional contextual information, the data analytics service ensures that the refined query specifically investigates potential data inconsistencies.

Figure 3:
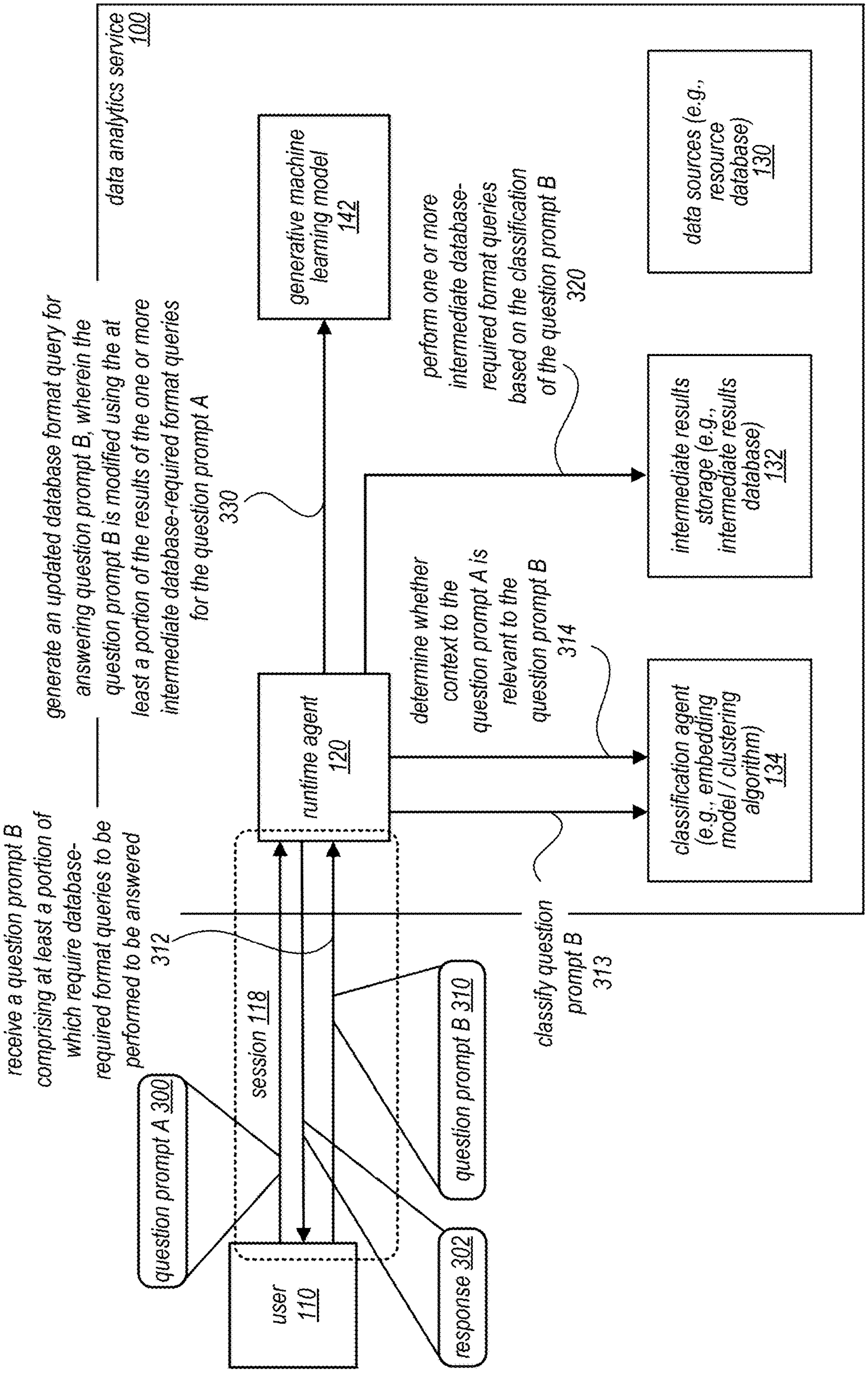
FIG. 3 illustrates a more detailed view of a data analytics service that generates an updated database format query for answering a question prompt, wherein the question prompt is modified using the at least a portion of the results of one or more intermediate database format queries for an earlier question prompt in a same session, according to some embodiments.

FIG. 3 illustrates a more detailed view of a data analytics service that generates an updated database format query for answering a question prompt, wherein the question prompt is modified using the at least a portion of the results of one or more intermediate database format queries for an earlier question prompt in a same session, according to some embodiments.

In some embodiments, the runtime agent 120 may receive a question prompt A 300 comprising at least a portion of which require database format queries to be performed to be answered and generate a response 302 as discussed in FIGS. 1A-1C. When a user submits question prompt A 300, the runtime agent 120 may process it by parsing the natural language input, identifying key entities, and determining whether a database format query needs to be executed. The runtime agent 120 may then generate an initial database format query using a generative machine learning model 142, execute the database format query against the data sources 130, and store the results in the intermediate results storage 132. After refining the database format query output through intermediate queries (e.g., metadata extraction or summarization), the runtime agent 120 may generate response 302, which is presented to a user 110. This response may be a direct numerical answer, a structured table, or a synthesized summary based on the retrieved data.

In some embodiments, the runtime agent 120 may receive 312 a question prompt B 310, which comprises at least a portion requiring database format queries to be performed to be answered. Question prompt B 310 may be submitted after question prompt A 300 within the same session 118 and a data analytics service 100 may maintain contextual continuity between both prompts. Since the session 118 remains active, the runtime agent 120 may reference prior queries, results, or classifications when interpreting question prompt B 310. The data analytics service 100 may allow a conversational-style interaction where follow-up queries, refinements, or contextual dependencies are handled more effectively via the intermediate results storage 132. In some embodiments, the runtime agent 120 may interact with the classification agent 134, such as an embedding model or clustering algorithm, to classify question prompt B 313 based on various contextual attributes, such as job type. The classification agent 134 may analyze the linguistic structure of question prompt B 310, extract domain-specific keywords, and map them to predefined categories based on previous interactions or organizational knowledge. For example, if question prompt B 310 pertains to outage analysis, and the user is identified as a grid operations analyst, the classification agent 134 may assign a category related to power grid analytics. Such classification associated with question prompts may guide how the runtime agent 120 selects relevant tables or prioritizes certain types of data processing for the intermediate database format queries.

In some embodiments, the runtime agent 120 may further interact with the classification agent 134 to determine 314 whether the context of question prompt A 300 is relevant to question prompt B 310. The classification agent 134 may utilize embeddings, similarity metrics, or semantic analysis techniques to compare the content and intent of both prompts. If question prompt B 310 is determined to be an elaboration, refinement, or logical continuation of question prompt A 300, the runtime agent 120 may retrieve relevant intermediate query results and/or results from the initial database format query stored from the processing of question prompt A 300. The data analytics service 100 may leverage prior query outputs rather than re-executing redundant operations. If the classification agent 134 determines that question prompt B 310 is unrelated to question prompt A 300, the runtime agent 120 may process it as an independent request.

In some embodiments, the runtime agent 120 may perform 320 one or more intermediate database format queries based on the classification of question prompt B 310. Once the classification agent 134 determines the category, domain, or job type associated with question prompt B 310, the runtime agent 120 may reference a predefined set of exploratory queries tailored to that classification. These intermediate queries may extract summary statistics, identify data distributions, or detect anomalies within the relevant dataset before executing a final query. If the classification indicates that question prompt B 310 is related to question prompt A 300, the runtime agent 120 may prioritize queries that refine, filter, or aggregate the previously retrieved results stored in the intermediate results storage 132 rather than querying the original data sources 130 again. This may reduce redundancy and improve response efficiency while ensuring that only the most relevant data is used for answering question prompt B 310.

In some embodiments, the runtime agent 120 may use a generative machine learning model 142 to generate 330 an updated database format query for answering question prompt B, wherein question prompt B is modified using at least a portion of the results of the one or more intermediate database format queries for question prompt A. The generative model 142 may integrate contextual information from the results of the intermediate queries and dynamically adjust the structure of the updated query. For example, if question prompt A 300 retrieved outage records over a 24-hour period, and question prompt B 310 asks, "Which locations had the highest number of repeat outages?" the runtime agent 120 may modify question prompt B 310 by incorporating previously computed aggregations from question prompt A 300. This modification may include filtering for locations where outage counts exceed a specific threshold, ranking results based on recurrence, or applying additional grouping conditions. The updated query may then be executed against the data sources 130 or the intermediate results storage 132, ensuring that the response to question prompt B 310 is both optimized and contextually aware.

Figure 4:
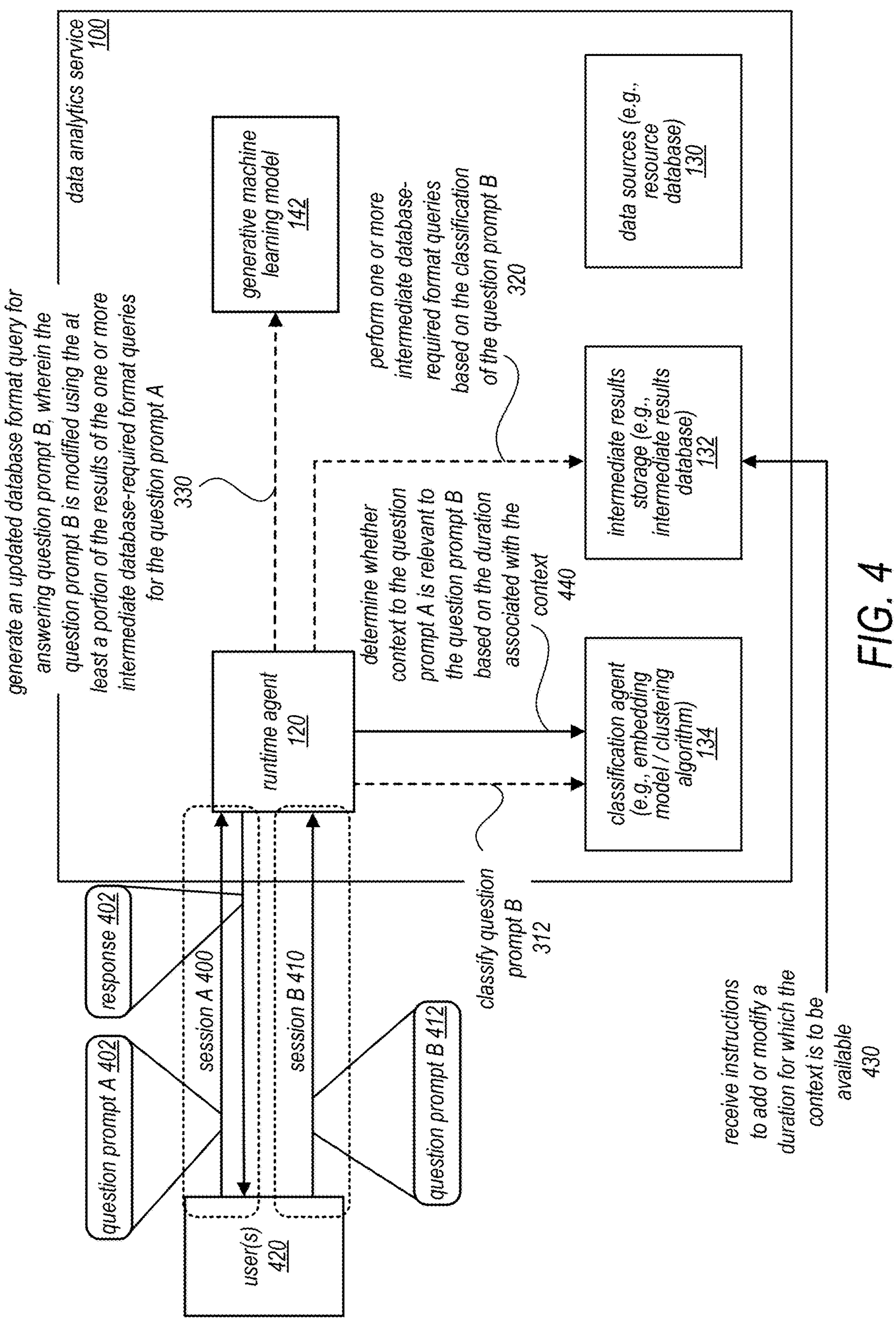
FIG. 4 illustrates a more detailed view of a data analytics service that determines whether context to a question prompt is relevant to another question prompt received at a different session based on the duration associated with the context, according to some embodiments.

FIG. 4 illustrates a more detailed view of a data analytics service that determines whether context to a question prompt is relevant to another question prompt received at a different session based on the duration associated with the context, according to some embodiments.

In some embodiments, a runtime agent 120 may receive a question prompt A 402 at session A 400 and may generate response 402 by executing an initial database format query on one or more data sources. In some embodiments, after retrieving the results, the runtime agent 120 may further refine the response by performing one or more intermediate database format queries on the initial query results. In some embodiments, session A 400 may be an isolated execution instance associated with a user interaction, wherein the runtime agent 120 processes the request independently from other sessions. In some embodiments, the runtime agent 120 may subsequently receive question prompt B 412 at session B 410, which may be a separate execution instance initiated independently from session A 400. In some embodiments, session B 410 may be associated with a different task, timeframe, or query scope and may be initiated by the same user or different user(s) 420. In some embodiments, the data analytics service 100 may track and manage sessions separately, ensuring that execution environments remain distinct unless explicit mechanisms for context-sharing are enabled.

In some embodiments, the intermediate results storage (e.g., intermediate results database) 132 may be utilized to store results from the initial database format query associated with question prompt A 402 as well as results from one or more intermediate queries executed to refine the response. In some embodiments, the data analytics service 100 may manage the intermediate results storage 132 by maintaining query results in structured repositories, indexing intermediate query results (e.g., metadata) for efficient retrieval, and enforcing retention policies to control the lifecycle of stored data. In some embodiments, users or system administrators may provide instructions to the data analytics service 100 to add or modify the duration for which context is to be available, ensuring that stored results are retained or discarded according to predefined rules or dynamic adjustments based on usage patterns. For example, the intermediate results storage 132 may receive 430 instructions to add or modify a duration for which the context is to be available 430. In some embodiments, the data analytics service 100 may provide mechanisms to configure permissions and access controls that govern how stored context may be shared across users and/or sessions. In some embodiments, customers may define role-based access controls to determine which users may access intermediate query results and shared context within the data analytics service 100. For example, users belonging to the same role (e.g., data analysts within a specific department) may be granted access to the stored intermediate results, allowing them to leverage previously computed results for similar question prompts across sessions, including different sessions, without redundant query execution. In some embodiments, the classification agent 134 may determine whether stored context from a previous session remains relevant and accessible based on both duration constraints and permission settings.

In some embodiments, the classification agent 134, may employ an embedding model, clustering algorithm, or other machine learning techniques, and may determine 440 whether the context stored for question prompt A 402 remains relevant to question prompt B 412 based on the duration associated with the stored context. In some embodiments, the classification agent 134 may analyze semantic similarity between prompts using embeddings, compare metadata from stored results, and assess the temporal validity of the context based on configured duration thresholds. In some embodiments, if the classification agent 134 may determine that the context remains relevant and has not expired, the runtime agent 120 may leverage stored insights from prompt A 402 to optimize the query execution for prompt B 412. Conversely, if the duration has lapsed or if the stored context is deemed unrelated, the runtime agent 120 may generate a new set of queries for prompt B 412 independently, ensuring that only the most relevant data is utilized for generating responses.

Figure 5:
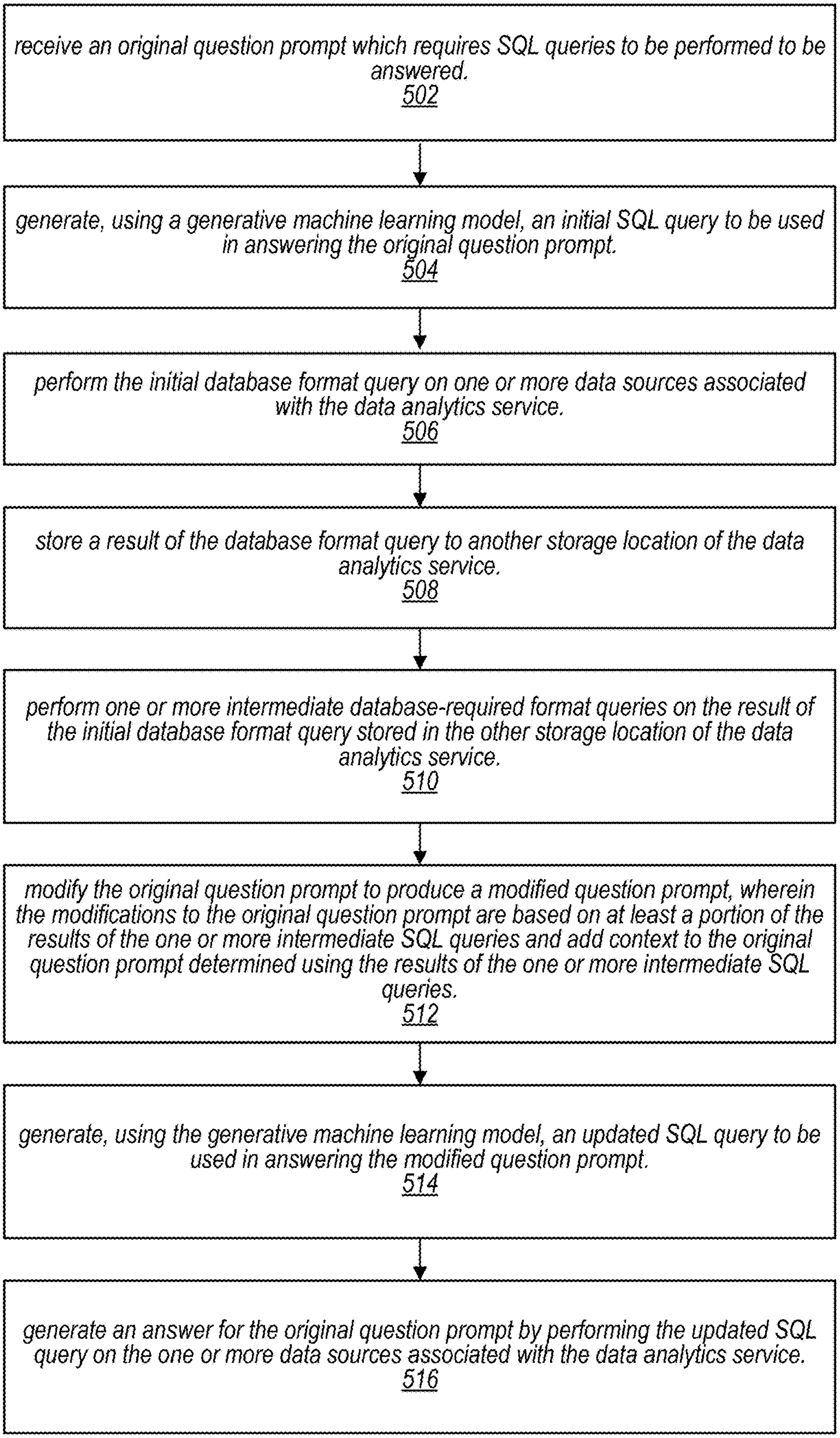
FIG. 5 illustrates a flowchart of operations performed by a data analytics service to generate an answer for a question prompt comprising at least a portion of which require database format queries to be performed, according to some embodiments.

FIG. 5 illustrates a flowchart of operations performed by a data analytics service to generate an answer for a question prompt comprising at least a portion of which require database format queries to be performed, according to some embodiments.

At block 502, a question prompt may be received by the data analytics service, wherein the prompt comprises at least a portion that requires a database format query to be performed in order to answer. In some embodiments, the question prompt may be a question prompt that requires SQL queries to be performed on a data source, as further discussed in FIG. 1A.

At block 504, a generative machine learning model may be used to generate an initial database format query based on the received question prompt. In some embodiments, the generative model may analyze the structure of the question prompt and generate a query that meets the data source requirements, as further discussed in FIG. 1B.

At block 506, the initial database format query may be performed on one or more data sources associated with the data analytics service. In some embodiments, the query results may be retrieved dynamically from the data sources and processed based on the generated query, as further discussed in FIG. 2.

At block 508, the result of the initial database format query may be stored in a designated storage location of the data analytics service. In some embodiments, the storage location may be configured to facilitate subsequent queries and may not be visible to a user providing a question prompt, as further discussed in FIG. 1B.

At block 510, one or more intermediate database format queries may be performed on the result of the initial query, which has been stored in the other storage location of the data analytics service. In some embodiments, these intermediate queries may intermediate query results may incorporate statistical summaries such as mean, median, mode, standard deviation, and distribution patterns of key numerical columns, which may help identify expected data ranges and potential anomalies, as further discussed in FIG. 1C.

At block 512, the question prompt may be modified based on the results of the one or more intermediate database format queries, wherein the modifications serve to add context or additional detail to the question prompt based on the intermediate query results.

At block 514, an updated database format query may be generated using the generative machine learning model to reflect the modifications made to the question prompt. In some embodiments, the updated database format query may be crafted to avoid potential errors as identified via intermediate database format queries, as further discussed in FIG. 2.

At block 516, the final answer to the question prompt may be generated by performing the updated database format query on the data sources associated with the data analytics service. In some embodiments, multiple iterations of intermediate database format query generation and updated database format query generation may be performed prior to determination of the final answer.

Figure 6:
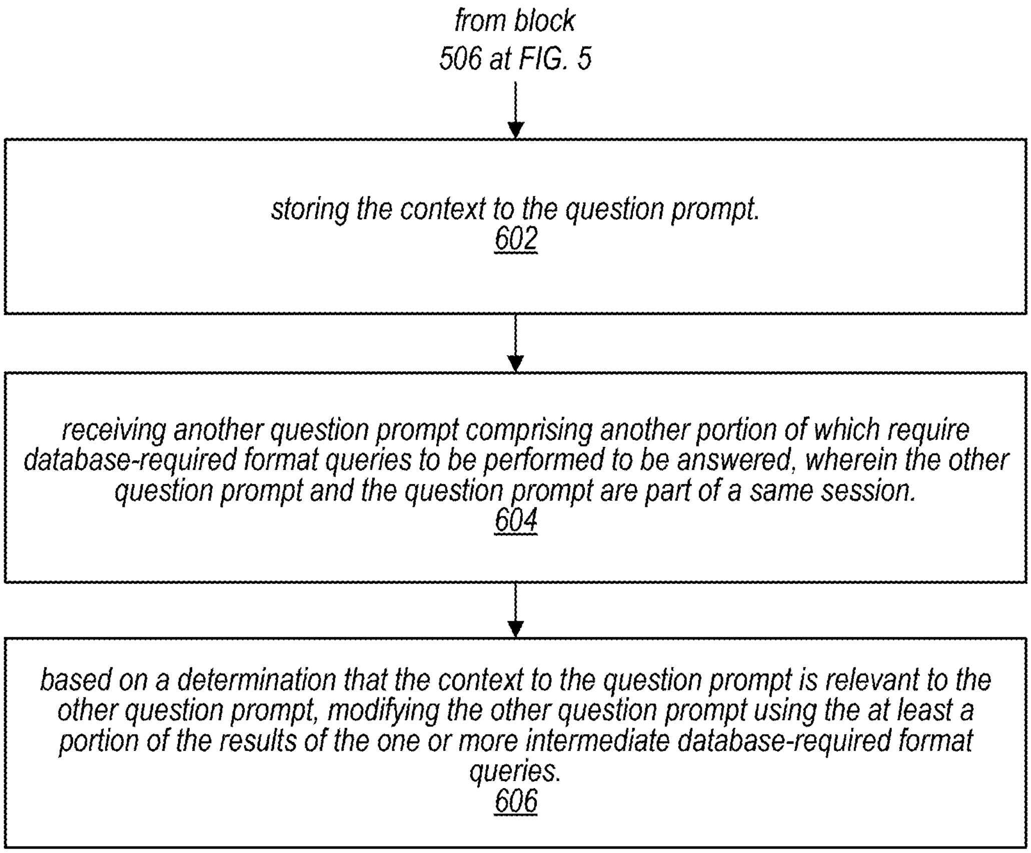
FIG. 6 illustrates a flowchart of operations performed by a data analytics service to store a request and a response in a non-temporary session datastore for a session based on a request to persist the request, according to some embodiments.

FIG. 6 illustrates a flowchart of operations performed by a data analytics service to store a request and a response in a non-temporary session datastore for a session based on a request to persist the request, according to some embodiments.

At block 602, the context to the question prompt may be stored for future reference. In some embodiments, such context may be retained within the data analytics service to enable further refinement or enhancement of subsequent question prompts within the same session, as further discussed in FIG. 1B.

At block 604, another question prompt may be received, wherein the prompt includes another portion that requires database format queries to be performed in order to be answered. In some embodiments, the other question prompt and the original question prompt may be part of the same session, enabling continuity in query processing and response generation, as further discussed in FIG. 3.

At block 606, based on a determination that the context from the original question prompt is relevant to the other question prompt, the other question prompt may be modified using at least a portion of the results from the one or more intermediate database format queries. In some embodiments, the modifications may ensure that the context is applied dynamically according to the classification of the other question prompt, as further discussed in FIG. 2.

Example Computer System

Figure 7:
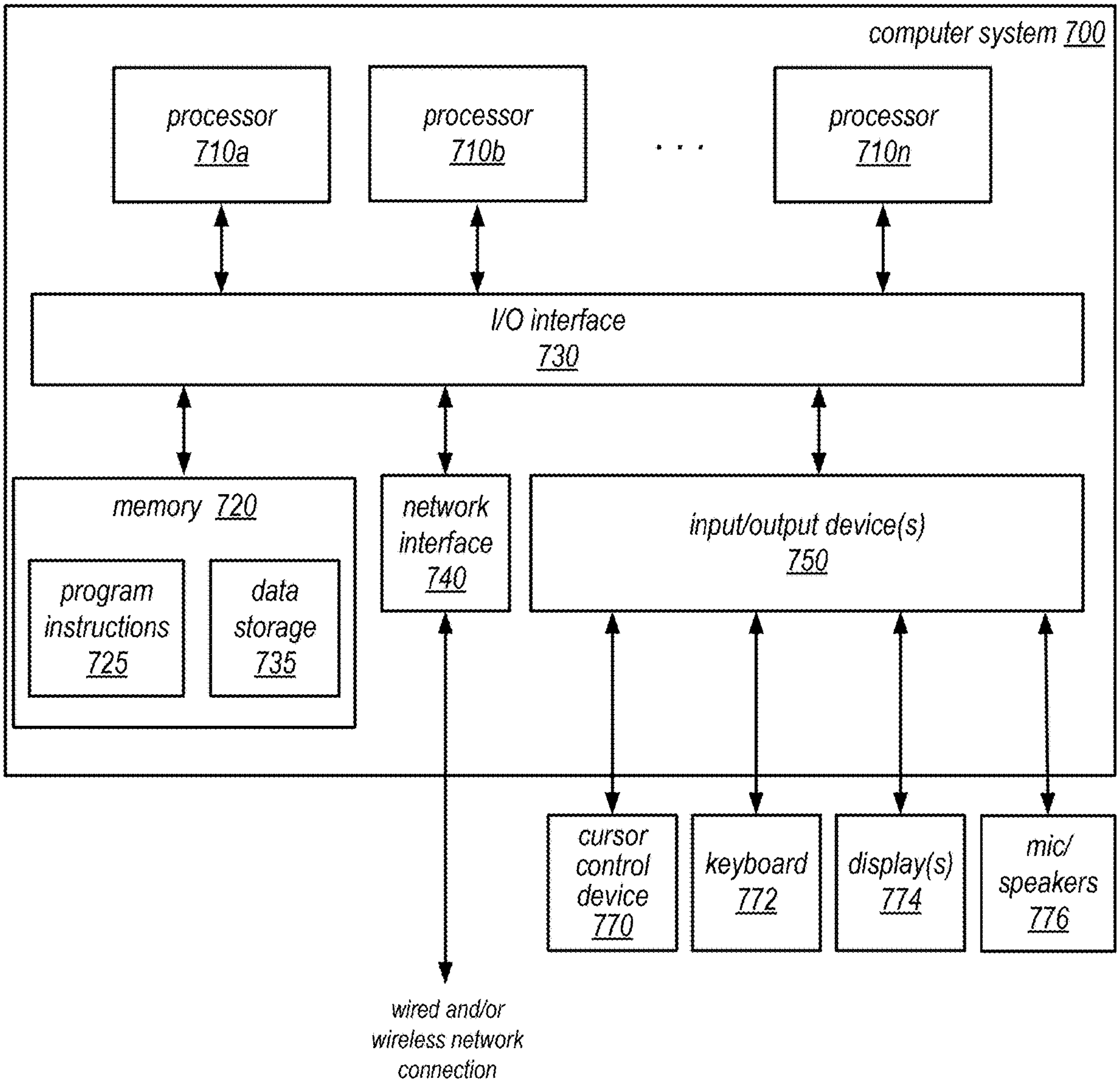
FIG. 7 illustrates a block diagram illustrating an example computer system that implements some, or all, of the techniques described herein, according to some embodiments.

Any of various computer systems may be configured to implement processes associated with a data analytics service or any other component of the above figures. For example, FIG. 7 illustrates a block diagram illustrating an example computer system that implements some, or all, of the techniques described herein, according to some embodiments. In various embodiments, any component of the above figures, FIGS. 1A-6, may each include one or more computer systems 700 such as that illustrated in FIG. 7.

In the illustrated embodiment, computer system 700 includes one or more processors 710 coupled to a system memory 720 via an input/output (I/O) interface 730. Computer system 700 further includes a network interface 740 coupled to I/O interface 730. In some embodiments, computer system 700 may be illustrative of servers implementing enterprise logic or that provide a downloadable application, while in other embodiments servers may include more, fewer, or different elements than computer system 700.

In various embodiments, computing device 700 may be a uniprocessor system including one processor or a multiprocessor system including several processors 710a-710n (e.g., two, four, eight, or another suitable number). Processors 710a-710n may include any suitable processors capable of executing instructions. For example, in various embodiments, processors 710a-710n may be processors implementing any of a variety of instruction set formats (ISAs), such as the x77, PowerPC, SPARC, or MIPS ISAs, or any other suitable ISA. In some embodiments, processors 710a-710n may include specialized processors such as graphics processing units (GPUs), application specific integrated circuits (ASICs), etc. In multiprocessor systems, each of processors 710a-710n may commonly, but not necessarily, implement the same ISA.

System memory 720 may be configured to store program instructions and data accessible by processor(s) 710a-710n. In various embodiments, system memory 720 may be implemented using any suitable memory technology, such as static random-access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within system memory 720 as code (e.g., program instructions) 725 and data storage 735.

In one embodiment, I/O interface 730 may be configured to coordinate I/O traffic between processors 710a-710n, system memory 720, and any peripheral devices in the device, including network interface 740 or other peripheral interfaces. In some embodiments, I/O interface 730 may perform any necessary protocol, timing, or other data transformations to convert data signals from one component (e.g., system memory 720) into a format suitable for use by another component (e.g., processor 710). In some embodiments, I/O interface 730 may include support for devices attached through various types of peripheral buses, such as a variant of the Peripheral Component Interconnect (PCI) bus standard or the Universal Serial Bus (USB) standard, for example. In some embodiments, I/O interface 730 may include support for devices attached via an automotive may bus, etc. In some embodiments, the function of I/O interface 730 may be split into two or more separate components, such as a north bridge and a south bridge, for example. Also, in some embodiments, some, or all of the functionality of I/O interface 730, such as an interface to system memory 720, may be incorporated directly into processors 710a-710n.

In some embodiments, the network interface 740 may be coupled to I/O interface 730, and one or more input/output devices 750, such as cursor control device 770, keyboard 772, display(s) 774, and microphone/speakers 776. In some cases, it is contemplated that embodiments may be implemented using a single instance of computer system 700, while in other embodiments multiple such computer systems, or multiple nodes making up computer system 700, may be configured to host different portions or instances program instructions as described above for various embodiments. For example, in one embodiment some elements of the program instructions may be implemented via one or more nodes of computer system 700 that are distinct from those nodes implementing other elements.

Network interface 740 may be configured to allow data to be exchanged between computing device 700 and other devices associated with a network or networks. In various embodiments, network interface 740 may support communication via any suitable wired or wireless general data networks, such as types of ethernet networks, cellular networks, Bluetooth networks, Wi-Fi networks, Ultra-wideband Networks, for example. Additionally, network interface 740 may support communication via telecommunications/telephony networks such as analog voice networks or digital fiber communications networks, via storage area networks such as Fibre Channel SANs, or via any other suitable type of network and/or protocol.

In some embodiments, system memory 720 may be one embodiment of a computer-readable (e.g., computer-accessible) medium configured to store program instructions and data as described above for implementing embodiments of the corresponding methods, systems, and apparatus. However, in other embodiments, program instructions and/or data may be received, sent, or stored upon different types of computer-readable media. Generally speaking, a computer-readable medium may include non-transitory storage media or memory media such as magnetic or optical media, e.g., disk or DVD/CD coupled to computing device 700 via I/O interface 730. One or more non-transitory computer-readable storage media may also include any volatile or non-volatile media such as RAM (e.g., SDRAM, DDR SDRAM, RDRAM, SRAM, etc.), ROM, etc., that may be included in some embodiments, of computing device 700 as system memory 720 or another type of memory. Further, a computer-readable medium may include transmission media or signals such as electrical, electromagnetic, or digital signals, conveyed via a communication medium such as a network and/or a wireless link, such as may be implemented via network interface 740. Portions or all of multiple computing devices such as that illustrated in FIG. 7 may be used to implement the described functionality in various embodiments; for example, software components running on a variety of different devices and servers may collaborate to provide the functionality. In some embodiments, portions of the described functionality may be implemented using storage devices, network devices, or various types of computer systems. The term "computing device" and "ECU" as used herein, refers to at least all these types of devices, and is not limited to these types of devices.

The various methods as illustrated in the figures and described herein represent illustrative embodiments of methods. The methods may be implemented manually, in software, in hardware, or in a combination thereof. The order of any method may be changed, and various elements may be added, reordered, combined, omitted, modified, etc. For example, in one embodiment, the methods may be implemented by a computer system that includes a processor executing program instructions stored on a computer-readable storage medium coupled to the processor. The program instructions may be configured to implement the functionality described herein (e.g., the functionality of various services, databases, devices, and/or other communication devices, etc.).

Various modifications and changes may be made as would be obvious to a person skilled in the art having the benefit of this disclosure. It is intended to embrace all such modifications and changes and, accordingly, the above description to be regarded in an illustrative rather than a restrictive sense.

Various embodiments may further include receiving, sending, or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g., SDRAM, DDR, RDRAM, SRAM, etc.), ROM, etc., as well as transmission media or signals such as electrical, electromagnetic, or digital signals, conveyed via a communication medium such as network and/or a wireless link.

What is claimed is:

1. A system, comprising:

one or more computing devices comprising one or more processors configured implement a data analytics service, configured to:

receive an original question prompt which requires SQL queries to be performed to be answered;

generate, using a generative machine learning model, an initial SQL query to be used in answering the original question prompt;

perform the initial SQL query on one or more data sources associated with the data analytics service;

store a result of the SQL query to another storage location of the data analytics service;

perform one or more intermediate SQL queries on the result of the initial SQL query stored in the other storage location of the data analytics service;

modify the original question prompt to produce a modified question prompt, wherein the modifications to the original question prompt are based on at least a portion of the results of the one or more intermediate SQL queries and add context to the original question prompt determined using the results of the one or more intermediate SQL queries;

generate, using the generative machine learning model, an updated SQL query to be used in answering the modified question prompt; and generate an answer for the original question prompt by performing the updated SQL query on the one or more data sources associated with the data analytics service.

2. The system of claim 1, wherein the context to the original question prompt determined using the results of the one or more intermediate SQL queries comprises one or more of:

column statistics for the result of the SQL query;

business contexts for data heuristically determined based on the results of the SQL queries; or data format or schema context for the result of the SQL query.

3. The system of claim 1, wherein the result of the SQL query is stored in an internal table at the other storage location, and wherein the result of the SQL query is not visible to a user of the data analytics service submitting the original question prompt.

4. The system of claim 1, wherein the one or more computing devices configured to implement the data analytics service are configured to:

store the context to the original question prompt;

receive another question prompt comprising another portion of which require SQL queries to be performed to be answered, wherein the other question prompt and the original question prompt are part of a same session; and based on a determination that the context to the original question prompt is relevant to the other question prompt, modify the other question prompt using the at least a portion of the results of the one or more intermediate SQL queries.

5. The system of claim 4, wherein the one or more computing devices configured to implement the data analytics service is configured to:

classify a given job type or a given business context for the original question prompt and the other question prompt; and determine that the context to the original question prompt is relevant to the other question prompt based on the given job type or the given business context and a job type or the business context for the original question prompt.

6. The system of claim 1, wherein the one or more computing devices configured to implement the data analytics service is configured to:

store, at a long-term storage for the data analytics service, the context to the original question prompt;

receive, at a different session from a session for the original question prompt, another question prompt comprising another portion of which require SQL queries to be performed to be answered; and based on a determination that the context to the original question prompt is relevant to the other question prompt, modify the other question prompt using the at least a portion of the results of the one or more intermediate SQL queries.

7. The system of claim 6, wherein the one or more computing devices configured to implement the data analytics service is configured to:

receive instructions to add or modify a duration for which the context is to be available; and determine that the context to the original question prompt may be used to determine whether it is relevant to the other question prompt based on the duration for the context.

8. A method, comprising:

receiving, using a data analytics service, a question prompt which requires database format queries to be performed to be answered;

generating, using a generative machine learning model, an initial database format query to be used in answering the at least a portion of the original question prompt;

performing the initial database format query on one or more data sources associated with the data analytics service;

storing a result of the database format query to another storage location of the data analytics service;

performing one or more intermediate database format queries on the result of the initial database format query stored in the other storage location of the data analytics service;

modifying the original question prompt to produce a modified question prompt, wherein the modifications to the original question prompt are based on based on at least a portion of the results of the one or more intermediate database format queries and add context to the original question prompt determined using the results of the one or more intermediate database format queries;

generating, using the generative machine learning model, an updated database format query to be used in answering the modified question prompt; and generating an answer for the original question prompt by performing the updated database format query on the one or more data sources associated with the data analytics service.

9. The method of claim 8, wherein the context to the original question prompt determined using the results of the one or more intermediate database format queries comprises one or more of:

column statistics for the result of the database format query;

business contexts for data heuristically determined based on the results of the database format queries; or data format or schema context for the result of the database format query.

10. The method of claim 8, wherein the result of the database format query is stored in an internal table at the other storage location, and wherein the result of the database format query is not visible to a user of the data analytics service submitting the original question prompt.

11. The method of claim 8, further comprising:

storing the context to the original question prompt;

receiving another question prompt comprising another portion of which require database format queries to be performed to be answered, wherein the other question prompt and the original question prompt are part of a same session; and based on a determination that the context to the original question prompt is relevant to the other question prompt, modifying the other question prompt using the at least a portion of the results of the one or more intermediate database format queries.

12. The method of claim 11, further comprising:

classifying a given job type or a given business context for the question prompt and the other question prompt; and determining that the context to the question prompt is relevant to the other question prompt based on the given job type or the given business context and a job type or the business context for the question prompt.

13. The method of claim 8, further comprising:

storing, at a long-term storage for the data analytics service, the context to the original question prompt;

receiving, at a different session from a session for the original question prompt, another question prompt comprising another portion of which require database format queries to be performed to be answered; and based on a determination that the context to the original question prompt is relevant to the other question prompt, modifying the other question prompt using the at least a portion of the results of the one or more intermediate database format queries.

14. The method of claim 13, further comprising:

receiving instructions to add or modify a duration for which the context is to be available; and determining that the context to the original question prompt may be used to determine whether it is relevant to the other question prompt based on the duration for the context.

15. One or more non-transitory, computer-readable storage media storing program instructions that, when executed on or across one or more computing devices, cause the one or more computing devices to:

receive, using a data analytics service, a question prompt which requires database format queries to be performed to be answered;

generate, using a generative machine learning model, an initial database format query to be used in answering the at least a portion of the original question prompt;

perform the initial database format query on one or more data sources associated with the data analytics service;

store a result of the database format query to another storage location of the data analytics service;

perform one or more intermediate database format queries on the result of the initial database format query stored in the other storage location of the data analytics service;

modify the original question prompt to produce a modified question prompt, wherein the modifications to the original question prompt are based on based on at least a portion of the results of the one or more intermediate database format queries and add context to the original question prompt determined using the results of the one or more intermediate database format queries;

generate, using the generative machine learning model, an updated database format query to be used in answering the modified question prompt; and generate an answer for the original question prompt by performing the updated database format query on the one or more data sources associated with the data analytics service.

16. The one or more non-transitory, computer-readable, storage media of claim 15, wherein the context to the original question prompt determined using the results of the one or more intermediate database format queries comprises one or more of:

column statistics for the result of the database format query;

business contexts for data heuristically determined based on the results of the database format queries; or data format or schema context for the result of the database format query.

17. The one or more non-transitory, computer-readable, storage media of claim 15, wherein the result of the database format query is stored in an internal table at the other storage location, and wherein the result of the database format query is not visible to a user of the data analytics service submitting the original question prompt.

18. The one or more non-transitory, computer-readable, storage media of claim 15, wherein the program instructions, when executed on or across one or more computing devices, further cause the one or more computing devices to:

store the context to the original question prompt;

receive another question prompt comprising another portion of which require database format queries to be performed to be answered, wherein the other question prompt and the original question prompt are part of a same session; and based on a determination that the context to the original question prompt is relevant to the other question prompt, modify the other question prompt using the at least a portion of the results of the one or more intermediate database format queries.

19. The one or more non-transitory, computer-readable, storage media of claim 18, wherein the program instructions, when executed on or across one or more computing devices, further cause the one or more computing devices to:

classify a given job type or a given business context for the original question prompt and the other question prompt; and determine that the context to the original question prompt is relevant to the other question prompt based on the given job type or the given business context and a job type or the business context for the original question prompt.

20. The one or more non-transitory, computer-readable, storage media of claim 15, wherein the program instructions, when executed on or across one or more computing devices, further cause the one or more computing devices to:

store, at a long-term storage for the data analytics service, the context to the original question prompt;

receive, at a different session from a session for the original question prompt, another question prompt comprising another portion of which require database format queries to be performed to be answered; and based on a determination that the context to the original question prompt is relevant to the other question prompt, modify the other question prompt using the at least a portion of the results of the one or more intermediate database format queries.

* * * * *